US008901853B2

(12) United States Patent
Kraft

(10) Patent No.: US 8,901,853 B2
(45) Date of Patent: Dec. 2, 2014

(54) MULTI-STRING LED DRIVE SYSTEM

(71) Applicant: Analog Devices, Inc., Norwood, MA (US)

(72) Inventor: Jonathan Kraft, Frederick, CO (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 13/742,770

(22) Filed: Jan. 16, 2013

(65) Prior Publication Data
US 2014/0015424 A1    Jan. 16, 2014

Related U.S. Application Data

(60) Provisional application No. 61/670,458, filed on Jul. 11, 2012.

(51) Int. Cl.
G05F 1/00     (2006.01)

(52) U.S. Cl.
USPC ........ 315/308; 315/247; 315/291; 315/185 S; 315/312

(58) Field of Classification Search
USPC ....... 315/247, 185 S, 224, 291, 307–312, 209
See application file for complete search history.

(56) References Cited

U.S. PATENT DOCUMENTS

| | | | |
|---|---|---|---|
| 8,169,161 B2 * | 5/2012 | Szczeszynski et al. | 315/308 |
| 8,384,311 B2 * | 2/2013 | Gray et al. | 315/307 |
| 8,525,433 B2 * | 9/2013 | Lee et al. | 315/291 |
| 8,536,806 B2 * | 9/2013 | Kitagawa et al. | 315/308 |
| 2014/0015427 A1 | 1/2014 | Sagen et al. | |

* cited by examiner

Primary Examiner — Tuyet Thi Vo
(74) Attorney, Agent, or Firm — Schwegman Lundberg & Woessner, P.A.

(57) ABSTRACT

A multi-string LED drive system for multiple LED strings powered by a common line voltage. A plurality of current control circuits are connected in series with respective LED strings, each of which includes a transistor which causes a desired LED string current to be conducted when a sufficient voltage is applied to the transistor's gate. A "maximum" circuit receives each of the gate voltages at respective inputs and outputs a voltage which is proportional to the greatest of the received voltages. A line regulator circuit receives the output of the maximum circuit and a signal which represents a target gate voltage at respective inputs and generates the common line voltage such that the highest of the gate voltages is approximately equal to the target gate voltage, such that system power efficiency is optimized in cases of imbalance between LED string voltage drops and/or sink device characteristics.

11 Claims, 3 Drawing Sheets

US 8,901,853 B2

MULTI-STRING LED DRIVE SYSTEM

RELATED APPLICATIONS

This application claims the benefit of provisional patent application No. 61/670,458 to Kraft et al., filed Jul. 11, 2012.

BACKGROUND OF THE INVENTION

1. Field of the Invention

This invention relates generally to series/parallel LED drive systems, and more particularly to techniques designed to optimize the power efficiency of such systems.

2. Description of the Related Art

LED lighting strategies may employ LEDs driven in series, parallel, or both. LEDs driven in series by definition all share the same current. If all LEDs share the same current, ideally the brightness of the LEDs will be matched. Some applications require a number of LEDs to be driven with matched brightness, and so connecting the LEDs in series accomplishes the task. A problem can arise, however, if a very large number of LEDs must be driven in series. The series-connected LEDs are powered by a line voltage necessary to provide the necessary current; however, finding line regulators able to support the large line voltage needed for a high LED count series string may be difficult or cost prohibitive.

LEDs may also be arranged in parallel-connected 'strings', each of which is driven by a current source or (most commonly) a current sink circuit. But brightness matching between the parallel-connected LEDs is limited by the imperfect matching of the drive circuits, which can vary widely depending on the choice of sink implementation. A parallel LED configuration does have the advantage of typically requiring a lower line voltage than does a series configuration, which may be a benefit in some applications. Also, in some applications LEDs are connected in parallel because different currents need to be driven through the LEDs.

Due to the issues noted above, the best approach may be a compromise between the series and parallel solutions: a "series/parallel" solution. Note that a series/parallel solution could in principle be implemented by simply taking the series approach discussed above and creating multiple copies of this solution. However, this cut and paste approach adds cost to the overall solution because of the need for separate line regulators for each string (or "channel"). In some cases a single integrated circuit (IC) with multiple regulator channels may be able to take the place of multiple regulators, but for a number of solutions an appropriate multiple output regulator may not exist or may still be cost prohibitive due to the number of non-regulator external components required.

A cost effective compromise employing a series/parallel solution is shown in FIG. 1. Here, each series LED string 10, 12, 14 has its own independent current sink, but at the same time all series strings share a common line voltage $V_{line}$ driven from a single line regulator 16. The conventional solution for choosing an appropriate line voltage value recognizes that the LED sink devices (NMOS FETs M1, M2 and M3 in FIG. 1, but other devices might also be used) are easiest to work with when all the devices operate in their active region. An NMOS FET will operate in its active region so long as its drain-source voltage ($V_{ds}$) is sufficiently large. Thus, for a series/parallel LED solution such as that shown in FIG. 1, insuring that each sink device operates in active mode amounts to choosing a sufficiently large line voltage.

In order to maximize the power efficiency of a series/parallel LED solution such as that shown in FIG. 1, one would ideally like to choose the line voltage—here set by a voltage divider 18—such that all sink NMOS devices operate with just enough drain-source voltage to operate in active mode. Some power must be dissipated in the current sinks in order to achieve the desired LED drive currents, but ultimately any power dissipated in the sinks above the power required by the LEDs represents efficiency loss. To minimize the efficiency loss from current sink dissipation, the drain-source voltage of the sink devices should be designed to be as small as possible. This is, the power $P_{sink}$ dissipated in each current sink, given by $P_{sink}=I_{sink}*V_{ds}$ where $I_{sink}$ and $V_{ds}$ are the current conducted by and the voltage across the sink device, respectively, should be as small as possible.

Ideally, the line voltage is sufficient to guarantee nominal active operation for the NMOS sink devices, but also large enough to account for variations in the components (such as between the drain-source voltages needed for active operation of the sink devices and between the forward voltage drops of the LEDs). One technique used to achieve this utilizes a "minimum" circuit to dynamically account for variation between the forward voltage drops; this approach is illustrated in FIG. 2. The minimum circuit 20 receives the drain voltage of each of the NMOS current sinks and outputs the minimum drain voltage of the group. A line control amplifier 22 receives the minimum voltage and a reference voltage $V_{ref-drain}$ at respective inputs, and provides an output to the feedback input of line regulator 16 such that the LED channel with the minimum drain voltage operates at a desired target voltage equal to $V_{ref-drain}$. The drain reference voltage is typically chosen to be just large enough to guarantee that the sink device operates in its active region. Because all LED strings share a common line voltage, it can be inferred that the channel with the minimum drain voltage possesses the largest voltage drop across its string of LEDs. Therefore, once the system regulates the minimum drain voltage to the target voltage, it can be inferred that the remaining non-minimum channels have sink devices operating in their active regions because the voltage drop across the LED strings in each of those channels is known to be smaller than the voltage drop of the LED string of the minimum channel.

The minimum circuit solution of FIG. 2 works well in cases where the sink devices are well-matched. However, to ensure reliable operation, $V_{ref-drain}$ needs to be large enough to account for any variation between the sink devices over process and temperature. To improve the power efficiency of the system in FIG. 2, $V_{ref-drain}$ could be lowered below the point where the sink devices operate in active, so that they instead operate in their linear regions (also referred to herein as operating in the "triode region" or simply "in triode"). The first problem that arises with this strategy is that any sink device operating in triode will now have its current strongly dependent upon both its gate-source voltage and its drain-source voltage. Even in active mode, the sink device currents are weakly dependent upon drain-source voltage. A local closed loop around each sink device eliminates or at least reduces this dependence, and can help ensure that the current through the device regulates to the desired value. One example of a popular local closed loop topology is shown in FIG. 3 (which depicts only the LED string 10 portion of FIG. 2), which can be realized in either discrete or IC contexts. Here, sink device M0 is connected in series with a resistance R0 at a junction 30, and a "local current loop amplifier" 32 drives sink device M0 with a voltage $V_{g0}$ as needed to make the voltage at junction 30 equal to a reference voltage $V_{ref}$, such that LED string 10 conducts a desired current given by $V_{ref}/R0$. One advantage of the topology in FIG. 3 is the use of a resistance (R0) to set the current through the sink device and LED string, as resistors generally match well in IC designs and thus provide for good sink-to-sink current matching.

SUMMARY OF THE INVENTION

A multi-string LED drive system is presented which addresses the problems discussed above, with system power efficiency being optimized even in cases of imbalance between LED string voltage drops and/or sink device characteristics.

The present LED drive system is for controlling the current conducted by two or more LED strings which are powered by a common line voltage. The system includes:

a plurality of current control circuits connected in series with respective LED strings, each of which includes a transistor arranged to cause a desired LED string current to be conducted when a sufficient voltage is applied to the transistor's gate (assuming that the transistor is a FET);

a "maximum" circuit which receives the voltages on each of the FET gates at respective inputs and which outputs a voltage which is proportional to the greatest of the received gate voltages; and a line regulator circuit which receives the output of the maximum circuit and a signal which represents a target gate voltage at respective inputs and which generates the common line voltage such that the highest of the gate voltages is approximately equal to the target gate voltage.

The LED drive system is preferably arranged such that the target gate voltage is sufficient to operate each MOSFET in its triode region. Each current control circuit preferably includes a local current loop amplifier which uses a resistor to set the LED drive current.

These and other features, aspects, and advantages of the present invention will become better understood with reference to the following description and claims.

BRIEF DESCRIPTION OF THE DRAWINGS

FIG. 3 is a schematic diagram of a known local current loop topology that might be used with an LED drive system such as that shown in FIG. 2.

FIG. 5 is a schematic diagram of one possible embodiment of a line regulator circuit as might be used with the present LED drive system.

DETAILED DESCRIPTION OF THE INVENTION

Figure 1:
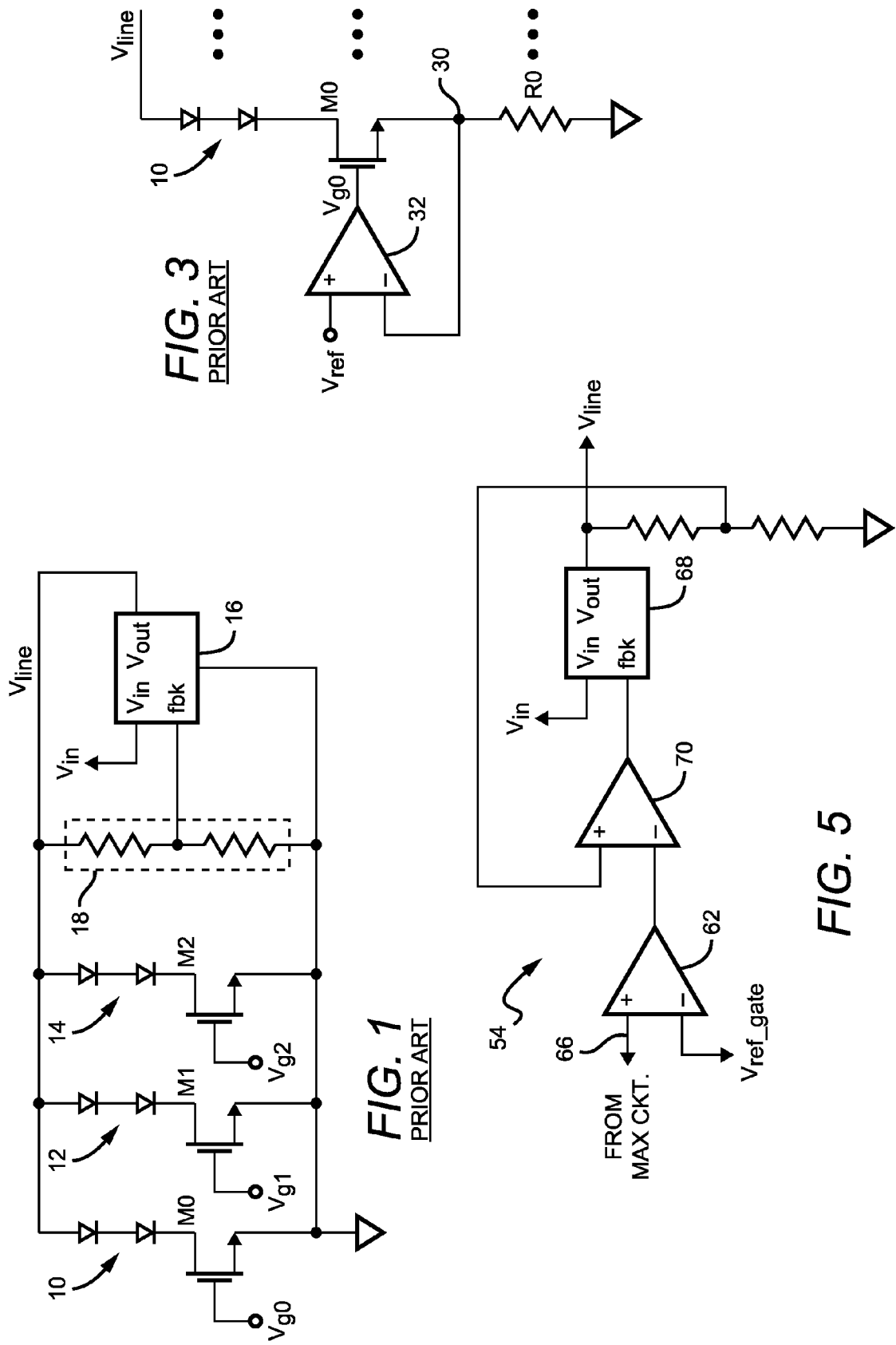
FIG. 1 is a schematic diagram of a known LED drive system.

As discussed above, to improve the power efficiency of a multi-string LED drive system, each string's current sink device—typically an NMOS FET—can be made to operate in its triode region. However, regardless of the current loop topology chosen, problems still arise when attempting to run a current sink device in triode. For example, with the sink device in triode, the gain of the current loop around the sink device (such as that shown in FIG. 3) drops considerably compared to the same loop running with the sink device in active. Also, with a system employing a "minimum drain voltage" system such as that shown in FIG. 2, if the common line voltage is chosen such that the sink devices run in triode, the control system for the line regulator and the current loop amplifier of the channel with the minimum drain voltage may come into conflict. Running the minimum drain sink device into triode insures that the current through this device depends strongly on both its drain-source and gate-source voltages. Ultimately the gate voltage is adjusted by the current regulation loop, and the drain voltage is for the most part adjusted by the line regulator. Two rival systems now ultimately affect the current through the minimum drain sink device and accompanying LED string; this makes the overall system difficult to design because the conflicting control systems create overlapping loops.

Another issue with a "minimum drain voltage" system, with local current loops as shown in FIG. 3 and with the sink devices operating in triode, is choosing a minimum drain reference ($V_{ref\_drain}$) voltage in view of the inherent limitation on the maximum gate voltage that can be provided by the local current loop amplifiers. For the channel that operates with the minimum drain voltage, lowering $V_{ref\_drain}$ requires that the sink device's gate voltage be increased in order to maintain the desired level of current regulation through the string. But if the required gate voltage exceeds the rail limit of the local current loop amplifier, the system will not be able to deliver the desired current through the minimum drain LED string. Ideally, the drain voltage target will be limited to insure that over all possible device conditions, the device gate voltage for the minimum channel will not be too close to the rail limit.

Thus, there are several limitations related to a minimum drain voltage solution as discussed above. When operating the sink devices in triode, the chosen minimum drain voltage must be limited in order to insure that the required gate voltages do not exceed the maximum gate drive capability of the local current loop amplifiers. Also, while a minimum drain voltage system automatically adjusts for mismatches in voltage drops across different LED strings, it does not automatically adjust for mismatches between sink devices. And as previously noted, the line voltage regulator loop of the system may conflict with the local current loop for the channel with the minimum drain voltage.

Figure 4:
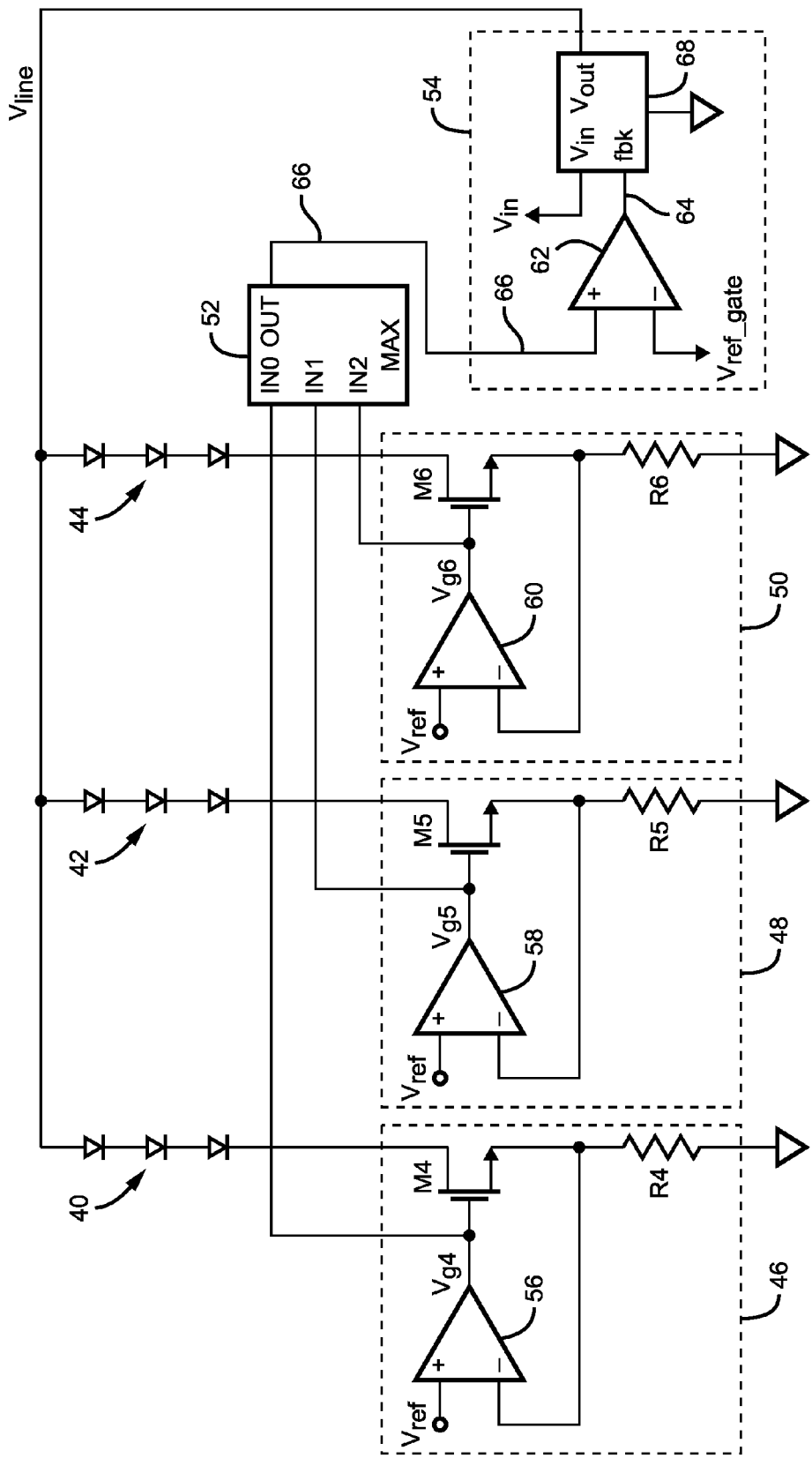
FIG. 4 is a schematic diagram of one possible embodiment of a multi-string LED drive system in accordance with the present invention.

The present multi-string LED drive system addresses many of the problems discussed above; one possible embodiment is shown in FIG. 4. The system controls the current conducted by two or more LED strings 40, 42, 44 which are powered by a common line voltage $V_{line}$; one or more of the LED strings may include two or more LEDs connected in series. The system includes a plurality of current control circuits 46, 48, 50 connected in series with respective LED strings, with each of the current control circuits including a transistor M4, M5, M6 arranged to cause a desired LED string current to be conducted when a sufficient voltage is applied to the transistor's control input (the base terminal if a BJT, but preferably the gate terminal of a MOSFET as shown in FIG. 4). However, instead of a "minimum circuit" as discussed above, the present system employs a "maximum circuit" 52 which receives the voltages on the gates of MOSFETs M4, M5 and M6 at respective inputs, and which outputs a voltage which is proportional to (preferably equal to) the greatest of the received gate voltages. A line regulator circuit 54 receives the output of the maximum circuit and a signal which represents a target gate voltage at respective inputs, and generates common line voltage $V_{line}$ such that the highest of the gate voltages is approximately equal to the target gate voltage.

Current control circuits 46, 48, 50 are preferably local current loops, each of which includes a resistance (R4, R5, R6) connected between each channel's sink device (M4, M5, M6, respectively) and a circuit common point. Each current control circuit also includes an amplifier (56, 58, 60) which receives a reference voltage ($V_{ref}$) at a first input and the voltage at the junction of the resistance and the sink device at a second input and which is arranged to provide a voltage ($V_{g4}$, $V_{g5}$, $V_{g6}$) to the MOSFET's gate needed to force the voltage at the junction to be approximately equal to $V_{ref}$. In this way, the values of $V_{ref}$ and R4, R5 and R6 determine the current conducted by each LED string.

Line regulator circuit 54 preferably includes an error amplifier 62 which provides an output 64 that varies with the difference between the output 66 of maximum circuit 52 and a voltage $V_{ref\_gate}$ which represents a target gate voltage. Amplifier output 64 is provided to the feedback input of a voltage regulator 68, which provides common line voltage $V_{line}$ as needed to drive the output of error amplifier 62 to zero, which occurs when the output of maximum circuit 52 equals $V_{ref\_gate}$ (and the highest of the gate voltages is approximately equal to the target gate voltage). It is well-understood that in practice, error amplifier 62 is likely to include additional components which provide, for example, frequency compensation, optical coupling, etc.

The output of maximum circuit 52 preferably runs in continuous time. Amplifiers 56, 58, 60 have an associated maximum output voltage at which they can operate in steady state, which is largely determined by the amplifier's rail voltages. The target gate voltage is preferably selected to be approximately equal to this maximum output voltage, which is alternatively referred to herein as the "near-rail limit". For most practical sink devices, having the gate voltage at or near the maximum voltage limit of local current loop amplifiers 56, 58, 60 will collapse the sink devices into deep triode. As a result, the drain-source voltages across the sink devices will be small, thereby reducing waste power dissipation.

The present system optimizes system power efficiency in cases of imbalance between LED string voltage drops, as well as mismatch between sink device characteristics. Consider for the first case a situation where all sink devices are identically matched, but one LED string drops more voltage than the others. The LED string with the greater voltage drop will force its sink device to have a lower drain-source voltage than the other sink devices. In order for the local current loop amplifier to get the sink device to conduct the desired LED string current through the string with the largest drop, the current loop amplifier will increase the gate voltage of the respective sink device. The gate voltage required for this sink device will be larger than the gate voltages needed for the other sink devices, since the drain-source voltages for the remaining sink devices must be larger due to the lesser voltage drops across the remaining LED strings. Maximum circuit 52 will lock on to the larger gate voltage, which causes line regulator circuit 54 to adjust $V_{line}$, to the point where the local current loop of the LED channel with the maximum gate voltage (the "maximum channel") adjusts the gate voltage to the desired target ($V_{ref\_gate}$). At this point, the maximum channel has been driven to have the drain-source voltage of its sink device as small as possible. The drain-source voltage for the sink device of this channel cannot be driven any lower by line regulator circuit 54, since that in turn would require the gate of the sink device to have a voltage above that which can be continuously supplied by the local current loop amplifier. Instead, the system is targeted to where the gate voltage of the maximum channel sink device is as large as practically possible. The remaining channels have larger drain-source voltages across their sink devices owing to their lesser LED string voltage drops, but $V_{line}$ cannot be driven any lower because the maximum channel would once again require a sink device gate voltage above the near-rail limit. Thus, at this point, the system is operating at or near the maximum possible power efficiency.

For the case where the sink devices are mismatched, consider a scenario where now the voltage drops across all of the LED voltage strings are identical. Further assume that all the sink devices are identical except for one which is slightly weaker, due to, for example, a larger device threshold voltage or a slightly reduced mobility. For a given value of $V_{line}$, since all LED strings have the same voltage drop, the drain-source voltages of all sink devices are initially equal. In order to conduct the same current as do the matched sink devices, the weakest sink device must be driven to a larger gate voltage. Maximum circuit 52 locks onto this larger gate voltage, and causes line regulation circuit 54 to adjust $V_{line}$ until the local current loop of the weakest sink device puts the gate voltage at the desired near-rail limit. At this newly-adjusted $V_{line}$, voltage, all the identical sink devices still have the same drain-source voltage across them, since the voltage drops across all the LED strings are the same. The weakest sink device is now driven with the near-rail limit gate voltage, and since the remaining sink devices have stronger characteristics they are supplied with lower gate voltages from their local current loops in order to regulate the same current. The drain-source voltages of the sink devices cannot be reduced any further by lowering $V_{line}$, since, in order to maintain the string currents, the channel with the weak sink device would be forced to provide a gate voltage that exceeds the near-rail limit. Thus, by definition, the system is once again in its maximum power efficiency state. The present system achieves this result even in cases where imbalances exist in the sink device characteristics and the LED string voltage drops simultaneously.

Thus, this control scheme always adapts to whatever $V_{ds}$ value is necessary to provide accurate current regulation at the minimum power dissipation. The LED strings which do not have the highest gate voltage still operate satisfactorily, though with slightly higher drain-source voltages, with the independent local current loops ensuring accurate current regulation.

As a practical matter the target maximum gate regulation voltage ($V_{ref\_gate}$) is not set at the absolute local current loop amplifier maximum, but slightly lower (the 'near-rail limit') so that the local amplifier does not exhibit any sort of rail-limited collapse when the system operates in steady state. Also, by forcing the maximum sink device gate to a slightly lower target voltage, the remaining channels may obtain sink device gate voltages that are slightly larger, which is necessary for the maximum circuit to function properly. If the target gate voltage was set equal to the rail-limited voltage output of a current loop amplifier, then a situation can arise where all sink device gates drive to the rail maximum, the line regulator voltage is too low, and the maximum circuit cannot drive the line regulator any higher because all sink device gate voltages are equal. In this scenario the currents through each independent LED string would likely be below intended value.

When arranged as described herein, the present system ensures that one sink device will always be driven to the near-rail limit voltage, which in turn ensures that the drain-source voltage of the same sink device is as small as possible. The present system does not suffer from the problem inherent in a minimum drain voltage system (such as that shown in FIG. 2) of having to pre-choose the drain-source voltage. Instead, the present system automatically chooses the optimal drain-source voltage during operation.

Figure 2:
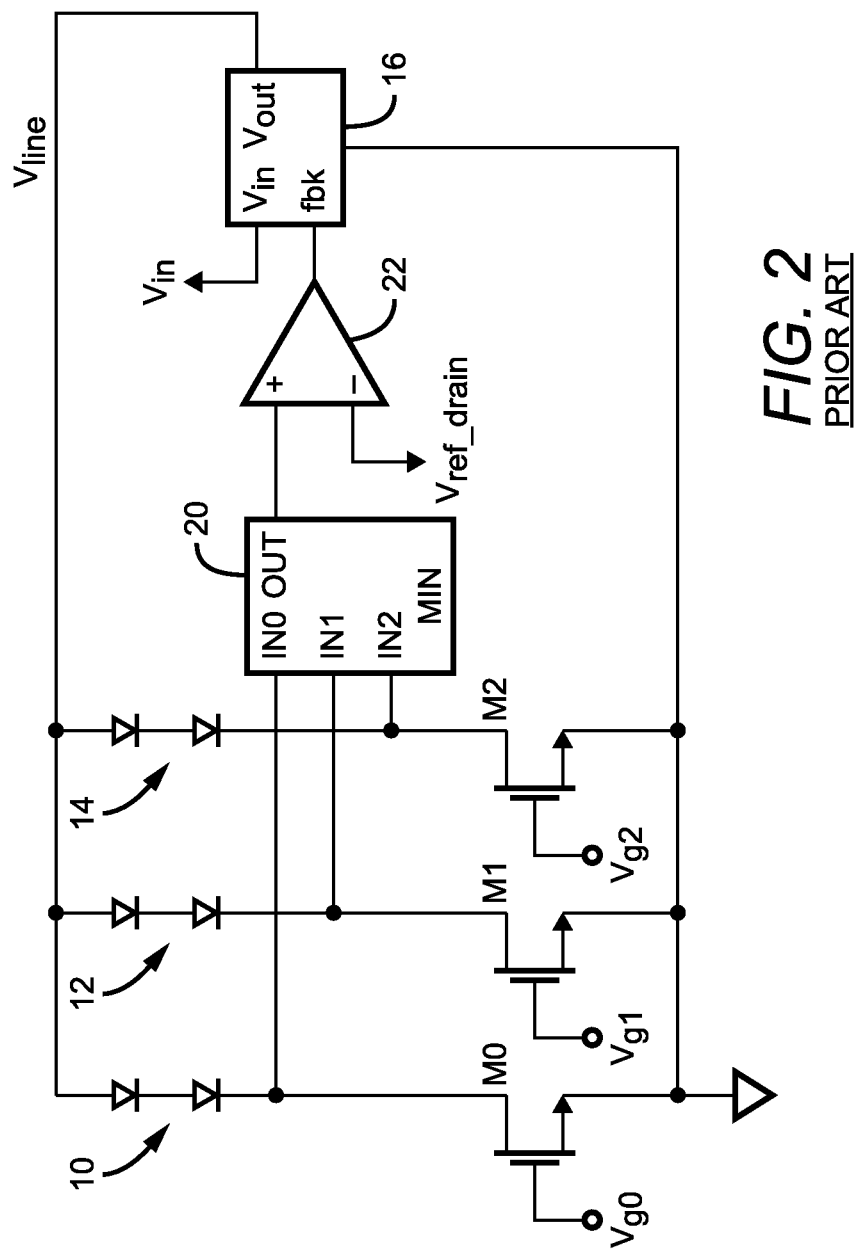
FIG. 2 is a schematic diagram of a known LED drive system which uses a "minimum drain voltage" control scheme.

Line regulation circuit 54 could be implemented in many different ways and with many different regulator chips, as long as the regulator is arranged to vary its output voltage in response to the voltage applied to an input pin such as the feedback ('fbk') pin shown in FIGS. 1, 2 and 4. Numerous voltage regulator ICs can be obtained that provide this functionality. Typically, these ICs require only a few external resistors, inductors, and/or capacitors for a fully functioning regulator design. ICs also exist that provide only the control system and reference, with the power train to be assembled by the user.

It should be noted that stabilizing the line regulator circuit arrangement as shown in FIGS. 1, 2 and 4 in a general control loop can be difficult, because the gains of the local current loops and of the line regulation circuit appear as direct terms in the overall general loop gain.

The circuit shown in FIG. 5 can be useful if the basic arrangement is problematic. Here, an additional amplifier 70 is used to close the loop locally around voltage regulator IC 68, which serves to flatten some of the gain terms associated with the voltage regulator from the point of view of the greater loop. The use of a local loop around the voltage regulator has the added benefit of also allowing the voltage regulator to more quickly respond to external stimuli on the regulator output, as opposed to waiting for the stimuli to be corrected for by the greater loop.

Note that though the described and illustrated embodiments employ current sink circuits to conduct the LED string currents, the present system is equally applicable to an arrangement employing current source circuits.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A multi-string LED drive system for controlling the currents conducted by two or more LED strings which are powered by a common line voltage, said system comprising:
   a plurality of current control circuits connected in series with respective LED strings, each of said current control circuits including a transistor arranged to cause a desired LED string current to be conducted when a sufficient voltage is applied to said transistor's control input;
   a maximum circuit which receives the voltages on each of said control inputs at respective inputs and which outputs a voltage which is proportional to a highest said received control input voltages; and
   a line regulator circuit which receives the output of said maximum circuit and a signal which represents a target control input voltage at respective inputs and which generates said common line voltage such that the highest of said received control input voltages is approximately equal to said target control input voltage, wherein said line regulator circuit further comprises:
   an error amplifier which provides an output;
   a voltage regulator which provides an output and an output voltage that varies with the signal received at a feedback input, said feedback input coupled to the output of said error amplifier; and
   a second amplifier interposed between said error amplifier and said feedback input, said second amplifier receiving the output of said error amplifier and a signal which varies with the output of said voltage regulator at respective inputs and providing an output to said feedback input such that said second amplifier forms a local loop around said voltage regulator.

2. The LED drive system of claim 1, wherein at least one of said LED strings comprises two or more LEDs connected in series.

3. The LED drive system of claim 1, wherein said maximum circuit is arranged to output a voltage which is approximately equal to the greatest of said received control input voltages.

4. The LED drive system of claim 1, wherein said error amplifier provides an output which varies with the difference between the output of said maximum circuit and said signal which represents said target control input voltage; and
   said voltage regulator varies its output voltage as needed to drive the output of said error amplifier to zero, said voltage regulator's output voltage being said common line voltage.

5. The LED drive system of claim 1, wherein the control inputs of said transistors are driven with respective drive circuits having an associated maximum output voltage at which the drive circuit can operate in steady state, said target control input voltage selected to be approximately equal to said maximum output voltage.

6. The LED drive system of claim 1, wherein each of said transistors is a MOSFET and said control input voltages are said MOSFETs' gate voltages.

7. The LED drive system of claim 6, wherein said target control input voltage is selected to ensure that each MOSFET operates in its triode region.

8. The LED drive system of claim 1, wherein each of said current control circuits comprises:
   a resistance connected between said transistor and a circuit common point; and
   an amplifier which receives a reference voltage at a first input and the voltage at the junction of said resistance and said transistor at a second input, said amplifier and transistor forming a local current loop arranged to provide said voltage to said transistor's control input needed to force the voltage at said junction to be approximately equal to said reference voltage.

9. The LED drive system of claim 8, wherein said reference voltage is selected such that said desired LED string current is conducted by said resistance.

10. A multi-string LED drive system for controlling the currents conducted by two or more LED strings which are powered by a common line voltage, said system comprising:
    a plurality of current control circuits connected in series with respective LED strings, each of said current control circuits comprising:
    a MOSFET having its drain connected in series with an LED string; a resistance connected between said MOSFET's source and a circuit common point; and
    an amplifier which receives a reference voltage at a first input and the voltage at the source of said MOSFET at a second input, said amplifier and MOSFET forming a local current loop arranged to provide a voltage to said MOSFET's gate needed to force the voltage at said MOSFET's source to be approximately equal to said reference voltage such that a desired LED string current is conducted by said resistance;
    a maximum circuit which receives the voltages on each of said MOSFET gates at respective inputs and which outputs a voltage which is approximately equal to a highest of said received gate voltages; and
    a line regulator circuit which receives the output of said maximum circuit and a signal which represents a target gate voltage at respective inputs and which generates said common line voltage such that output of said maximum circuit is approximately equal to said target gate voltage, said target gate voltage selected to ensure that each MOSFET operates in its triode region;

an error amplifier that provides an output which varies with the difference between the output of said maximum circuit and said signal which represents said target control input voltage;

a voltage regulator which provides an output voltage that varies with the signal received at a feedback input, said feedback input coupled to the output of said error amplifier; and a second amplifier receiving the output of said error amplifier and a signal which varies with the output of said line regulator circuit at respective inputs and providing an output to said feedback input such that said second amplifier forms a local loop around said voltage regulator.

11. The LED drive system of claim 10, wherein the gates of said MOSFETs are driven with respective drive circuits having an associated maximum output voltage at which the drive circuit can operate in steady state, said target gate voltage selected to be approximately equal to said maximum output voltage.

* * * * *

UNITED STATES PATENT AND TRADEMARK OFFICE
CERTIFICATE OF CORRECTION

| | |
|---|---|
| PATENT NO. | : 8,901,853 B2 |
| APPLICATION NO. | : 13/742770 |
| DATED | : December 2, 2014 |
| INVENTOR(S) | : Jonathan Kraft |

It is certified that error appears in the above-identified patent and that said Letters Patent is hereby corrected as shown below:

In the Claims

In column 7, line 49, in Claim 1, before "said", insert --of--, therefor

Signed and Sealed this
Fourteenth Day of July, 2015

Michelle K. Lee
*Director of the United States Patent and Trademark Office*